UNITED STATES PATENT OFFICE.

JOHANN CARL WILHELM FERDINAND TIEMANN, OF BERLIN, GERMANY, ASSIGNOR TO HAARMANN & REINER, OF HOLZMINDEN, GERMANY.

PROCESS OF MAKING KETONE FROM ORRIS-ROOT.

SPECIFICATION forming part of Letters Patent No. 559,636, dated May 5, 1896.

Application filed May 11, 1893. Serial No. 473,851. (Specimens.) Patented in Germany April 25, 1893, No. 72,840; in England May 1, 1893, No. 8,735; in Sweden May 8, 1893, No. 5,155; in Norway May 18, 1893, No. 3,258; in Luxemburg June 23, 1893, No. 1,845; in Belgium June 24, 1893, No. 105,248; in Italy June 30, 1893, XXVII, 34,127, LXVII, 385; in Spain August 31, 1893, No. 14,653; in Austria-Hungary September 28, 1893, No. 24,420 and No. 50,761; in Portugal November 30, 1893, No. 1,830; in Canada March 24, 1894, No. 45,624, and in Denmark July 23, 1895, No. 132.

*To all whom it may concern:*

Be it known that I, JOHANN CARL WILHELM FERDINAND TIEMANN, a subject of the King of Prussia, residing at Berlin, in the Kingdom of Prussia, Germany, have discovered and produced a new and useful Aromatic Ketone, (for which I have obtained Letters Patent in Germany, No. 72,840, dated April 25, 1893; in Sweden, No. 5,155, dated May 8, 1893; in Denmark, No. 132, dated July 23, 1895; in Spain, No. 14,653, dated August 31, 1893; in Austria-Hungary, No. 24,420, tom. XLIII, fol. 3,799 and No. 50,761, tom. XXVII, fol. 3,671, dated September 28, 1893; in Canada, No. 45,624, dated March 24, 1894; in Norway, No. 3,258, dated May 18, 1893; in Portugal, No. 1,830, dated November 30, 1893; in Italy, Reg. Gen. vol. XXVII, No. 34,127 and Reg. Att. vol. LXVII, No. 385, dated June 30, 1893; in Belgium, No. 105,248, dated June 24, 1893; in Luxemburg, No. 1,845, dated June 23, 1893, and in England, No. 8,735, dated May 1, 1893,) of which the following is a specification.

By thoroughly studying the mixture of the different bodies obtained by extracting orris-roots with alcohol or ether and distilling the obtained extracts in a current of steam I have discovered that the aromatic principle of the orris-root (the root of *Iris florentina* and *Iris pallida*, &c.,) is a ketone composed according to the formula $C_{13}H_{20}O$, and which may be termed the "natural violet ketone of orris-root."

From the analysis of the orris-root, and especially from the determination of the chemical nature of this new ketone, I have arrived at simple methods for separating the same from the substances contained in the commercial preparations—as, for instance, those known under the denomination "orris butter" and "orris-oil"—and to prepare on an industrial scale the pure fragrant ketone.

The preparation of the ketone may be carried out in the following manner: The alcoholic or etherous extract of the orris-root is subjected to distillation in a current of steam. Organic acids, such as myristic and oleic acid, &c., methylic ethers of these acids, alcohols of the higher series and small quantities of aldehydes, in particular oleic aldehyde, &c., pass over into the distillate together with the ketone. This distillate is dissolved in ether and the solution is agitated with a dilute solution of an alkali for separating the free acids. The residue of the ether solution so treated is dissolved in alcohol and mixed at ordinary temperature with a weak solution of alkaline hydrates, which saponify the ethers of the organic acids. After some minutes it is poured into water, the neutral oils are dissolved in ether, the ether is evaporated, and the residue is distilled in a current of steam. The ketone is one of the bodies passing over first. By repeating this operation several times I obtain a product giving the characteristic reactions of the ketones, but still containing small quantities of aldehydes (such as oleic aldehyde) and other impurities. To eliminate the aldehydes this product is treated with weak oxidizing agents—for instance, in heating it with water and silver oxide. The ketone is then converted into its phenyl-hydrazon or condensed with another substituted ammonia to a ketone derivative also decomposable by dilute acids.

In using the phenyl-hydrazon the process may be carried out in the following manner: Nearly equimolecular parts of the crude ketone and of phenyl-hydrazin are allowed to act upon one another during several days. The oily product is then distilled in a current of steam. The impurities and the surplus of hydrazin pass over and the hydrazon remains in the distilling apparatus. After having added dilute sulfuric acid or another acid the distillation is continued to obtain the pure body.

It is evident from the above description that the described process permits the separation from the ketone not only of the different substances also contained in the root, but likewise of the impurities produced in the course of the different processes employed for extracting the orris-root.

The new ketone is a ketone of the formula $C_{13}H_{20}O$, boiling under a pressure of sixteen millimeters at a temperature of 144° centigrade, having a specific gravity of 0.939 and an index of refraction $n^D = 1.50113$. It is insoluble in water and freely soluble in alcohol, ether, chloroform, and benzene.

The new ketone, as most of the ketones of the higher series, does not combine with bisulfite of sodium and is decomposed by the simultaneous action of chlorid of lime (bleaching-powder) and water into chloroform and an organic acid. At a high temperature hydriodic acid separates off water from the ketone and transforms it into a hydrocarbon of the formula $C_{13}H_{18}$, boiling at from 115° to 120° centigrade under a pressure of twelve millimeters. By strong oxidizing agents this hydrocarbon is converted into an acid of the formula $C_{12}H_{12}O_6$ melting at 214° centigrade.

The new ketone has the characteristic odor and flavor of the orris-root, and its use in a pure state for perfumery, confectionery, and distillation offers considerable advantages.

While extract of orris-root has heretofore been used, the aromatic principle has to my knowledge never been separated and used in its isolated condition.

What I claim is—

1. As a new product a fragrant ketone of the composition $C_{13}H_{20}O$, (natural violet ketone of orris-root) insoluble in water and soluble in alcohol, ether, chloroform and benzene, characterized by a specific gravity of 0.939, index of refraction 1.50113, boiling-point 144° centigrade under a pressure of sixteen millimeters mercury.

2. The herein-described method of producing a fragrant ketone from orris-root extract, which consists in distilling the extract in a current of steam, treating the distillate with alkali and subsequent distillation in a current of steam in the manner specified, treating the resulting distillate with oxidizing agents, transforming the resulting crude ketone by the addition of phenyl-hydrazin into a compound decomposable by dilute acids, such as its phenyl-hydrazon and finally separating the pure fragrant ketone with the use of a dilute acid.

In testimony whereof I have signed my name to this specification in the presence of two subscribing witnesses.

JOHANN CARL WILHELM FERDINAND TIEMANN.

Witnesses:
LUDWIG GLASER,
GUSTAV HÜLSMANN.